July 22, 1969

J. A. GROSS 3,456,846

DIP-TUBE APPARATUS FOR VALVED DISPENSING
OF A PLURALITY OF FLUIDS

Filed Jan. 10, 1968

Inventor
JEROME A. GROSS

Inventor
JEROME A. GROSS

J. A. GROSS 3,456,846

DIP-TUBE APPARATUS FOR VALVED DISPENSING
OF A PLURALITY OF FLUIDS

Filed Jan. 10, 1968

Inventor
JEROME A. GROSS

Inventor
JEROME A. GROSS 3,456,846
Patented July 22, 1969

1

3,456,846
DIP-TUBE APPARATUS FOR VALVED DISPENSING OF A PLURALITY OF FLUIDS
Jerome A. Gross, St. Louis, Mo., assignor, by mesne assignments, to Clayton Corporation, St. Louis, Mo., a corporation of Missouri
Continuation-in-part of application Ser. No. 677,360, Oct. 23, 1967. This application Jan. 10, 1968, Ser. No. 696,764
Int. Cl. B65d *35/22;* B67d *5/60*
U.S. Cl. 222—94                    18 Claims

ABSTRACT OF THE DISCLOSURE

A valve for dispensing two fluids, separately contained in a single dispenser, operates in upright position. The fluids may be dispensed jointly; for more complex functioning the spout may be purged with head space gas; or with slight modification, fluids may be dispensed alternately. The valve seat has a flow channel connected to a dip tube, and for such more complex functioning is zoned to open alternately to opposite sides. A rotatable restrictor controls the direction of tilt and locks the actuator against unintended tilting.

Related applications

This application is related to my co-pending application Ser. No. 677,360 filed Oct. 23, 1967, entitled, "Self-Purging Pressure Dispenser Valve," in which a portion of the present subject matter is disclosed. To the extent of the disclosure there made, the present application is a continuation-in-part of said prior application.

Background of the invention

This invention relates to valves for pressurized dispensing cans commonly used for shaving lather and other foams, for unfoamed liquid or semi-fluid products, and when equipped with spray nozzles, for products suited for dispensing by spraying. More particularly it relates to such valves as used on pressurized cans which contain two fluids maintained separate from each other, both of which are to be dispensed through a single tilt actuator, without inverting the dispenser.

In the prior art, a simple valve apparatus, useful for co-dispensing two fluids which reacted chemically with each other when mixed at the dispensing spout, is shown in U.S. Patent No. 3,326,416 to Hayes. In this apparatus, one fluid is contained in a collapsible bag sealed onto the head of a rigid tubular stem valve sealedly mounted in a resilient tubular seal. The valve head closes against an annular seating surface at the bottom of the seal; the head has a circle of perforated ports, in registration with the seating surface, to provide flow communication from the bag to a dispensing spout when the valve head is displaced. This apparatus must be inverted for dispensing.

No simple prior art apparatus exists for achieving such operation with the dispenser upright. In conventional apparatus for pressurized dispensing of a single fluid, a simple dip tube leads downward from a housing around the valve to the lower part of the dispenser. The presence of such housing makes it impossible to add a collapsible bag to the valve head. The complications required for co-dispensing in upright position are shown in U.S. Patent No. 3,326,416 to Hayes.

2

A heretofore unsolved problem of the prior art is that inherently some of the mixture of the two fluids will be left in the spout when the valve is closed. Such a residue of mixed reacted fluids is at best undesirable; for example, in some mixtures the spout may be blocked by undispensed product.

In my said co-pending application I teach how to purge the valve spout of residues. In that application, (which does not illustrate a collapsible bag for containing a second fluid) I disclose a simple valve utilizing a dip tube so connected as to conduct flow to one side of the valve head. Tilting movement which opens the valve head at this side results in dispensing of fluid from the bottom portion of the container, without inverting the container; this type of operation is preferred by many. When the valve is tilted in the opposite direction, the valve seat continues to seal off the dip tube, while at the opposite side of the head it so opens that gas from the head space may purge the spout, removing any product residue.

Summary of the invention

In the present invention, as in the Hayes patent, two fluids are maintained separate inside the same container by having one in a collapsible bag attached to the valve head. However, unique provisions are made to permit mounting a dip tube closely sideward of the collapsible bag; to channel the flow from the dip tube to flow channel means outward of the valve seating surface, for flow across the seating surface on tilting the valve head; to make the valve seat compressibly deformable, so that when tilted to open at one side it will remain sealed at the opposite side; to provide ports through the valve head from the bag to the seating surface at one side only of the head, these to remain sealed when the valve tilts to open at the opposite side; and to provide flow communication to such opposite side for varied purposes. One such purpose is to purge the valve spout with head space gas. Another is to attach a dip tube at that side to conduct flow of fluid from the bottom of the dispenser upward at that side; the valve may be operated by tilting alternately toward that side, to dispense only that fluid which is not contained in the bag. With a minor modification, this alternate tilting in opposite directions may dispense the two fluids separately.

In general (and without limiting to the scope hereof) my present invention may be described as follows:

I pre-assemble a container top wall member having a central aperture; a tubular elastic seal mounted therein, and a rigid valve member whose head closes against the seat of the seal. The seal has an enlarged portion beneath the top wall member. This includes a downwardly mounted seat surface, with two flow channel portions and opposite to each other, farther outward, and an integral downward-extending sealing skirt. A rigid valve member has a head whose outer edge is sealingly engaged by the sealing skirt regardless of the extent of tilt of the valve; and an upper head surface which closes against the seal seat surface. Ports through the valve head surface at one side, normally closed against the seal seat surface, lead from the collapsible bag, which is mounted onto a circular rim projecting downward from the valve head.

Unique means are provided to attach a dip tube and to conduct flow therefrom inwardly of the sealing skirt to the flow channel. In the preferred embodiment, the valve head is a somewhat squared plate which extends beyond the circular rim; and the dip tube attachment is a bore through a portion of the plate which is outward of the rim. In this embodiment, the skirt of the valve seal is also somewhat squared, to maintain it sealed as the valve tilts to open. In a modified embodiment the valve head is round, while the dip tube attachment is at an entrance boss in the seal outwardly of the skirt. The flow conduit which leads from the boss upward through the seal, thence inward, and thence downward to the flow channel at the outer side of the valve seat surface.

Compressive deformability, which maintains the valve head sealed at one side when it opens at the other, is afforded by making the seal surface relatively narrow, and forming the flow channel portions upwardly from the plane of the seat surface. The valve stem has an upper end projection which abuts the tubular wall of the elastic seal outwardly of the container; on tilting the stem the elastic resiliance of the tubular seal portion of the wall exerts a lifting force which presses one side of the valve head upwardly against the seat surface to hold it deformed for sealing. Diametrically opposite seat portions in the plane of the sealing surface extend outwardly to the skirt and provide a line of lesser deformability; this serves effectively to seal off the flow channel outwardly of one side of the seat surface from the flow channel outwardly of the other side.

Such pre-assembled valve and bag, without any dip tube or actuator, may be readily handled for filling the bag from its bottom end and then sealing it.

Thereafter on filling the dispensing container with the second fluid, crimping or sealing the container top member in place and adding pressurizing gas, a rotatable restrictor and a side-spouted tilt actuator may be mounted in place. In the preferred embodiment the tilt actuator has opposite tilt-restricting projections and a spout which extends sideward at an angle intermediate to the projections. The restrictor is a rotatable ring around the tilt actuator, fitting closely around it over an angle not exceeding 180°; the remainder of its inside surface is spaced farther away to permit tilt when aligned at the forward side of the actuator. The upper surface of the ring fits closely beneath the tilt-restricting projections. When the spaced-away portion of the inner ring surface is forward of the actuator, a pair of indentations in the ring upper surface are so aligned as to permit the tilt-restricting projections of the actuator to move forward and downward. When the ring position is reversed 180°, the actuator may be tilted aft. At other angular positions of the ring, it prevents tilting of the actuator in any direction.

Description of the preferred embodiments

Figure 4:
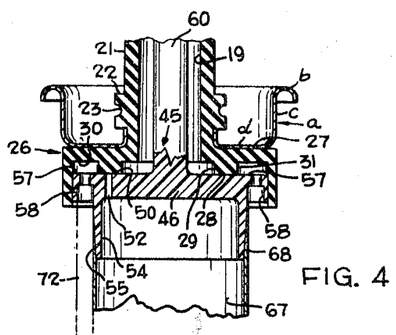
FIG. 4 is fragmenary sectional view similar to FIG. 1, taken along line 4—4 of FIG. 3.
Figure 5:
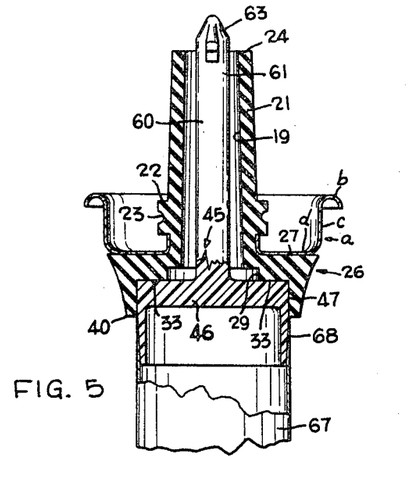
FIG. 5 is another view similar to FIG. 1, taken along line 5—5 of FIG. 3.
Figure 6:
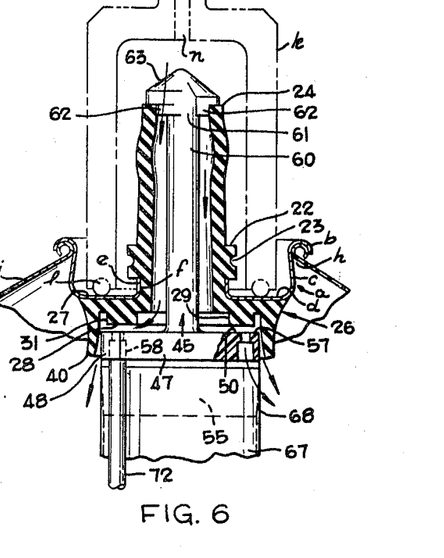
FIG. 6 is a view, partly in elevation and partly in section, of the pre-assembly of FIGS. 1–5 as assembled with a dip tube and sealed within a container, the parts being shown as pressurizing gas is inserted. A gassing head is shown in phantom lines.

FIGS. 1–11 inclusive illustrate a preferred embodiment of the present invention; of these, FIGS. 1–5 illustrate a pre-assembly thereof, FIG. 6 shows the pre-assembly mounted in the mouth of a dispenser after filling and during gassing; and FIGS. 7–11 illustrate this embodiment on final assembly with a tilt actuator and locking restrictor member, and positions of operation and locking.

Referring to FIGS. 1–5, a pre-assembly is preferably first made, comprising a conventional container top wall member or mounting cup generally designated $a$ having an outer rim $b$, a substantially cylindrical wall $c$ inwardly thereof adapted to be enlarged radially by crimping or expanding within the mouth of the dispensing container $j$ hereafter to be described, and a nearly horizontal wall portion $d$ extending inward to the upwardly projecting flange $e$ of a central aperture $f$ having a vertical axis $g$. Mounted sealedly within the aperture $f$ and having a bore 19 concentric with the axis $g$ is an elastic seal generally designated 20. It includes a tubular wall portion 21 extending outwardly through the aperture flange $e$, and includes an integral, radially enlarged circumferential flange 22, which overlays the aperture flange $e$ and serves to retain the seal 10 in the aperture $f$. The circumferential flange 22 includes a groove 23, utilized to secure a tilt actuator 75 hereafter to be described. The tubular wall portion 21 extends somewhat taperingly upward to a top wall edge 24.

At and beneath the horizontal wall $d$ of the mounting cup $a$, the seal has an enlarged seal portion which, though simply constructed, is of relatively complex geometry; for which reason the seal portion is itself generally designated 26. It commences at the base of the tubular wall portion 21 with a radially enlarged flat upper surface 27 presented against the horizontal wall $d$. The enlarged seal portion 26 includes a downwardly presented, principally arcuate, planar seat surface 28 commencing at a circular inner margin 29 surrounding the bore 19 and spaced slightly outward therefrom at best shown in FIGS. 1 and 2. Farther outward form the axis $g$ than the arcuate portions of the seat surface 28, the seal portion 26 has one or more flow channel portions 30 which in various embodiments of the invention may take on varying forms, as hereafter described.

In the embodiment of FIGS. 1–11, the seat surface 28 consists essentially of two opposed circular arcuate portions sideward of the axis $g$ and bounded on their outer sides by upward formed arcuate flow channel inner walls 31. Outwardly of these walls 31, the flow channel portions 30 are thus recessed upward from the plane of the seat surface 28, and are bounded as follows: by the arcuate flow channel walls 31 which extend less than 180°; by short outward-extending portions 32 which lead from the arcuate walls 31 to the inner wall of the sealing skirt 40 to be hereafter described; and by the inner surface of said skirt 40. The short portions 32 which extend outward at each of the ends of the arcuate flow channel walls 31, define diametrically opposed portions 33 thereof in the plane of the seal seat surface 28 which likewise extend outward to the skirt 40. These diametrically opposed portions 33 separate the seal flow channel portions 30 from each other on two opposite sides of the axis $g$, so that they may function separately as the valve head portion 46, to be described, is tilted to open to one side or the other.

Surrounding the flow portion or portions 30 is an integral downward-extending sealing skirt 40 which in this embodiment (as shown in FIGS. 1–5) is somewhat squared, having two pairs of opposed flat parallel side parts 41 joined by short arcuate parts 42. Radially outward of the flat side parts 41, the seal 26 has arcuate flange portions 43, each less than 90° in arcuate extent, which taper to the upper surface 27. Pressure within the dispenser against thetse flange portions 43 will hold the seal 26 securely beneath the wall $d$.

A substantially rigid valve member generally designated 45 serves as means, normally located centrally within the seal bore 19, to open and close the valve assembly. A head portion 46 closes against the seat surface 28. The head portion 46 in this embodiment is plate-like having four side edges 47 which make it nearly square with short corner diagonal edges 48. The edges 47, 48 are sealed inside the flat side parts 41 and connecting arcuate parts 42 of the sealing skirt 40. Inasmuch as the sealing skirt 40 is elastic, the sealing is maintained as the valve head portion 46 is tilting open for dispensing.

That upper portion of the valve head 46 which is in registration with the seal seat surface 28, is referred to as the valve head closing surface 50. Extending through the head portion 46 at the closing surface 50, in registration with that part of the seat surface 28 at one side only of the diametrically opposed surface portions 33, are port means such as the perforated ports 52 shown in FIGS. 3 and 4.

A bag attachment rim 54 extends downwardly from the valve head portion 46, and includes a tapering flange 55 presented downwardly beneath the lower edge of the skirt 40. The diameter of the rim 54 is preferably the entire distance between the oppositely spaced parallel side edges 47, for greatest bag capacity. The rim 54 surrounds the port 52, so that a bag 67, hereatfer to be described, sealedly mounted on the flange 55 of the rim 54, will permit flow through the port means 52 for discharge when the valve is opened. Since in the preferred embodiment, the ports 52 are on one side only of the valve head 46, only by downward tilting at the side of the head 46 at which the ports 52 are located can flow proceed through them across the seal seating surface 28 to the bore 19. At the cross-section shown in FIG. 5 the valve head 46 itself extends the full distance across opposite edges of the skirt 40; hence it functions with the diametrically opposed seat portions 33 to separate the flow channel means on one side from the flow channel means on the opposite side.

Figures 1, 2, 3:
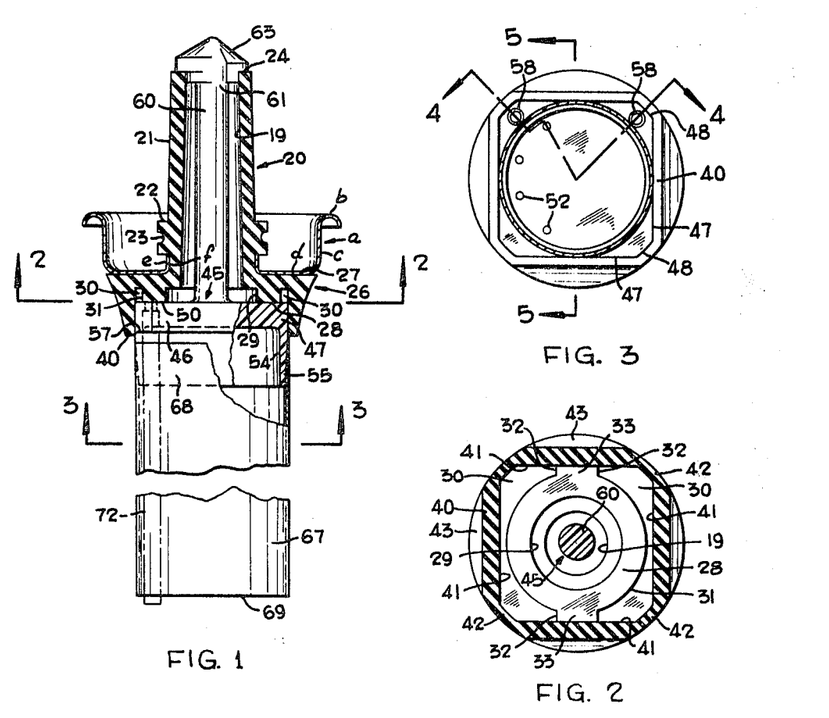
FIG. 1 is a side view, principally in section, of a valve and collapsible bag pre-assembly embodying the present invention. The phantom lines show a dip tube, subsequently to be added.
FIG. 2 is a sectional view taken along line 2—2 of FIG 1.
FIG. 3 is a view partly in section, taken along line 3—3 of FIG 1.

Portions of the upper surface of the valve head 46 outward of the closing surface portion 50 and inwardly of the skirt 51, serve, with the seal flow channel portions 30, as part of the flow channel means by which a first fluid contained in the bag 67 is introduced between the valve head 46 and the seal at a point inwardly of its skirt 40 but outwardly of its seat surface 28. These portions are referred to as the valve head flow-conducting surface portions 57. As shown in FIGS. 3 and 4, they are outwardly of the bag attachment rim 54. Through them extends means, such as the combined aperture and socket 58, to attach a dip tube and conduct flow into the flow channel so provided. The cross-sectional view FIG. 4 best illustrates the formation of the aperture and socket 58. In the preferred embodiment a socket 58 is located at each side, at adjacent corners of the plate-like valve head 46, to facilitate indexing of the parts for machine assembly.

A stem portion 60 extending outward from the valve head 46, normally concentrically through the tubular wall portion 21 of the seal 20, serves as central means to open the valve member 20. The stem portion 60 is of lesser thickness than the inner diameter of the tubular wall portion 21. When a tilt-opening force is applied to the stem portion 60, the valve head 46 will be restrained by the sealing skirt 40 from sliding across the seat surface 28 of the seal. Because of its lesser thickness than that of the tubular wall portion 21, on such tilting a squared-off side edge 47 will serve as a hinging point, subject to slight displacement upwardly in the flow channel portions 30. The head portion at the opposite side will open angularly from the seat surface 28 as the valve stem portion 60 tilts laterally out of concentricity with the tubular wall portion 21 of the seal 20.

As hereafter to be described, tilt will be initiated in a direction perpendicular to such flat side edge 47; and its abutment against the corresponding flat side 41 of the skirt 40 will guide the tilt movement in such direction.

Figure 9:
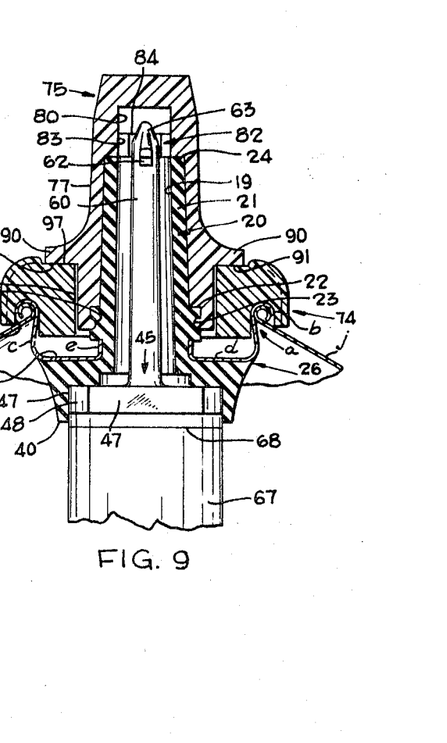
FIG. 9 is a vertical section of the upper portion of the dispenser of FIG. 7 as seen along line 9—9 of FIG. 8.

At the upper end of the stem portion 60 is a neck portion 61 which (as seen in FIG. 9) projects forward and aft to provide centering shoulders 62. Above these centering shoulders 62 projects, on the forward and aft side, a stem head 63, broader at its forward projection than its aft projection, as best shown in the plan view FIG. 8. These projections abut and overlay the top wall edge 24 of the tubular wall portion 21 of the seal. As seen from FIGS. 8 and 9, the width of the stem neck portion 61 and of the head portion 63 thereabove is substantially less than the inner diameter of the bore 19 at the top of the tubular wall portion 21 of the seal 20. The space at each side permits outflow through the bore 19. The length of the stem portion 60 is preferably such that the projections of the head portion 63 will at all times exert a small compressive downward force on the top edge 24 of the tubular wall 21. When the valve stem portion 60 is tilted, such compressive force is intensified on the side to which it is tilted, as shown by the upward arrow in FIG. 10. The resistance to compression exerts a lifting force on the valve member 45, which is in turn reacted at that side of the seal seat surface 28 at which the tilting takes place (see downward arrow of FIG. 10).

The depth to which the flow channel portion 30 is formed upwardly, as well as the depth of the seal seat inner margin 29, is substantial, compared to the width of the seal seat surface portion 28 and considering the elastic deformability of the rubbery material of which the seal 20 is molded. When such lifting force presses against the seat surface 28 at one side of the diametrically opposed seal portions 33, it will be there compressively deformed to correspond with the tilt angle. Thus as the valve member 45 is tilted to one side or the other of the diametrically opposed portions 33, such compressive deformation continues to seal off the flow channel means 30 at that side. If that is the side on which the perforated ports 52 are located, they will remain sealedly closed.

Another function served by the stem head portion 63 is to indicate the alignment of the perforated ports 52.

Included in the pre-assembly is a collapsible elongated tubular bag generally designated 67 preferably formed of a tough fluid-retaining plastic film. The upper margin 68 of the bag 67 is mounted sealedly on to the flange 55 of the rim 54, the bottom end 69 of the bag being left open at this stage.

The pre-assembly so described is readily assembled and tested. Its substantially symmetry as seen in FIGS. 1 and 5 renders it easy to handle on conveying equipment, in inverted position, to a bag filler; while the then lack of any nozzle actuator makes the assembly less expensive in case rejects should appear.

Figure 7:
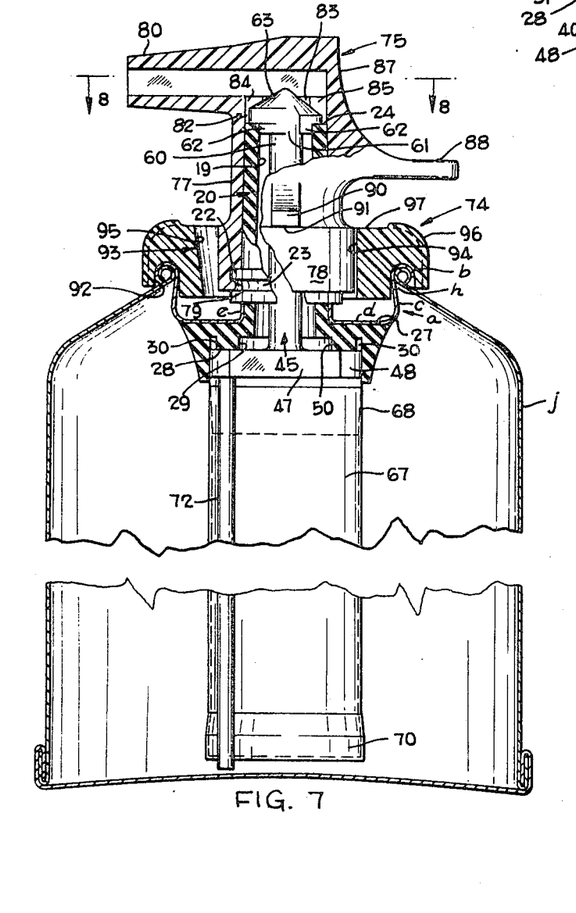
FIG. 7 is a side view, principally in section, of the finally assembled valved dispenser including a side-spout actuator and means which control the direction of its tilt or alternately lock it from tilting.
Figure 8:
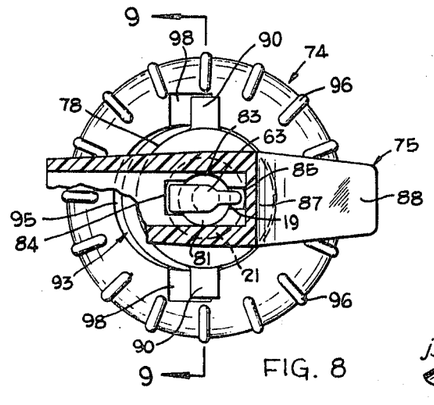
FIG. 8 is a partly fragmentary, partly sectional view taken along line 8—8 of FIG. 7.

With the assembly of FIG. 1 inverted, it is conveyed to a bag filler, where it is filled through the bottom end 69, the ports 52 being held sealedly closed against the resilience of the seat surface 28. A bottom seam 70, as shown in FIG. 7 is then sealed. The filled pre-assembly may then be tested for leakage.

Thereafter, a dip tube 72 is mounted alongside the bag 67 to lead upward from near the bottom of a container in which the assembly will be mounted; it is inserted and retained within the aperture socket 58. As will be obvious, the dip tube 72 serves as means to conduct the flow of a second fluid to flow channel means (comprised of the flow channel portion 30 of the seal body portion 26 and the flow-conducting surface portion 57 of the valve head 46) whereby it is introduced to a point inwardly of the seal skirt 40 but outwardly of the seat surface 28.

Such pre-assembly, with a first fluid filled in the bag 67 and a dip tube 72 attached, is crimped or seamed within the mouth $h$ of a dispensing container $j$, which may be a seamed can or any other suitable pressure vessel into which a quantity of a second fluid has been first filled. Crimping readies the product for the gassing operation shown in FIG. 6.

An inverted cup-like gassing head generally designated $k$ is shown schematically in phantom lines in FIG. 6. It has a seal $l$ about its lower rim. Through a gas supply tube $m$, pressurizing gas is supplied through its upper inlet $n$ under relatively high pressure. The gas passes the sides of the stem head portion 63 and enters the seal tubular wall 21. Its pressure is exerted against the upper surface of the head 46 around the base of the stem portion 60, forcing it downward as shown in FIG. 6. The gas pressure is then exerted outward on the skirt 40, disengaging its seal against the edges 47, 48 of the head portion 46 to flow into the head space of the container $j$ on release of the gas pressure, the parts are restored to the position shown in FIG. 1.

A tilt restrictor ring generally designated 74 and a tilt actuator generally designated 75 are then mounted in position over and around the tubular wall 21. The tilt actuator 75 serves as means to apply a tilting force to the stem portion 60 whereby to open the valve closing surface 50 from the seal seat surface 28; while the tilt restrictor ring 74 cooperates with it to direct its tilting to an azimuth angle at which the ports 52 will be withdrawn downwardly from the seal seat surface 28. Essentially the tilt actuator 75 is a dispensing spout, having a sleeve portion 77 seated onto the tubular wall portion 21 of the seal 20. The sleeve portion extends downwardly to the groove 23 of the flange 22, being somewhat radially enlarged at and above the level of the flange 22 to provide a cylindrical lower outer wall portion 78. Its lower inner surface is also enlarged to engage the seal flange 22 and has an inward-extending lower bead 79 which elastically grasps the groove 23.

The other principal portion of the tilt actuator means 75 is a spout portion 80 which extends sideward above the sleeve portion 77. Between them is an intermediate flow-conducting portion 81 having a noncircular, somewhat keyhole-like aperture generally designated 82 including arcuate side parts 83, a broad squared-off forward-extending part 84 and a narrower rear-extending part 85. These parts 84, 85 accommodate the shape of the stem head portion 63 and utilize it to key the actuator member 75 so that the direction of its spout portion 80 will be aligned with that side of the valve member 45 at which the ports 52 are positioned.

An aft presented thumb pad 87, aft of the spout portion 80, receives finger pressure for forward tilting. Immediately below it, a horizontally projecting aft lever portion 88 receives downward finger pressure for tilting the actuator 75 in the opposite direction.

Along the outer wall of the sleeve portion 77 at a height somewhat near its mid-height and spaced above the outer wall portion 78 are opposite tilt restricting projections 90. These extend perpendicular to the sideward spout portion 80, which is intermediate them. The projections 90 have lower surfaces 91 which are utilized to abut the ring 74 as hereafter described.

Figure 10:
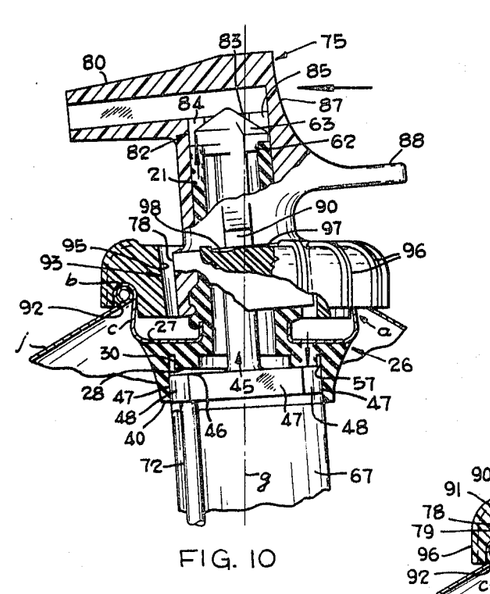
FIG. 10 is a side view principally in section, showing the positions of the parts when the actuator is tilted for dispensing.

The ring 74 has a lower circular groove 92 mounted slidably on the rim $b$ of the cup $a$, for rotation thereon. It has an inner wall generally designated 93 including a vertical portion 94 which fits closely against the outer wall portion 78 of the actuator means 75 over an angle not exceeding 180°; where these are adjacent to each other, tilting is prevented. The ring inner wall 93 includes a tilt-permitting portion 95, shown at the left side of FIG. 7, which is formed outwardly from the axis $g$ farther than the radius of the vertical portion 94 and thus spaced away from the outer wall portion 78. The outer upper edge of the ring 74 has manipulating ribs 96 leading upward from its outer periphery to a horizontal top surface 97 immediately beneath the lower surfaces 91 of the projections 90. A pair of indentations 98 is formed in the top surface 97; these indentations are immediately forward of the projections 90 when the ring 74 is positioned for forward tilt as shown in FIG. 7, to permit tilting movement as illustrated in FIG. 10. When the ring 75 is turned 180° from the position shown in FIGS. 7 and 10, the tilt-permitting portion 95 of the ring wall 93 will be so spaced away from the actuator outer wall portion 78 as to permit aft tilting, and the indentation 98 will be so spaced aft of the projections 90 as to accommodate their aft and downward movement attendant to such tilting. At other angular positions of the ring 74, the abutment of the projections 90 against the top surface 97 will prevent any tilting movement, locking the assembly from inadvertent actuation.

The rear sectional view FIG. 9 demonstrates how the projections 90 abutting the top surface 97, as well as the close proximity of the outer wall portion 78 to the vertical portion 94 of the inner wall 93, makes impossible any sideward tilting; hence the diametrically opposed planar portions 33 which separate the flow channel portions 30 of the seal 20 will continue unfailingly to effect such separation.

Referring to FIG. 10, when a forward force is applied to the thumb pad portion 87, the intermediate flow conducting portion 81, between the spout portion 80 and sleeve portion 77, will press the stem head portion 63 forwardly of the axis $g$ so that the valve member 45 departs from concentricity with the wall portion 21. This unseats the valve head portion 46 at the side (that is, beneath the spout 80) so that the first fluid (that in the bag 67) will be discharged through the ports 52 together with the discharge of the second fluid. The latter proceeds through the dip tube 72 and the flow channel 30, across the valve seating surface 28, the two fluids mixing there and in the bore 19 of the seal 20 for chemical reaction with each other. The upward arrow in FIG. 10 illustrates the lifting force exerted by the seal wall portion 21 on the valve member 45 when so tilted to one side. The downward arrow shows how such lifting force is reacted at the opposite side of the seal seating surface 28, to compressively deform it at the angle at which the head portion 46 is tilted; and by such deformation to keep the flow channel means 30 at that side sealed from the opposite flow channel means 30.

Figure 11:
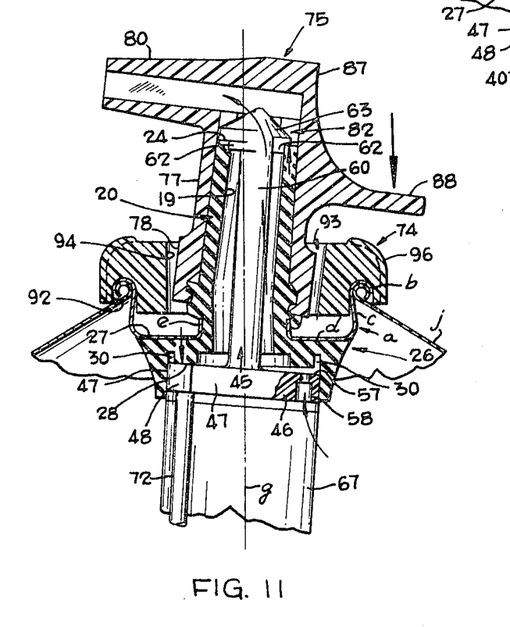
FIG. 11 is a view corresponding to FIG. 10 when tilted for purging.

In FIG. 11 the actuating force is applied by the downward arrow to the horizontal lever portion 88 to produce tilt in the opposite direction, permitted by rotating the tilt restrictor ring 74 180° from the position shown in FIG. 10. Here a lifting force applied to the valve member 45, shown by the upward arrow at the aft side, is reacted by a downward force at the forward side of the seal seating surface 28, deforming it compressively to the angle of tilt, thereby maintaining the forward flow channel means 30 sealed. By comparison with the sectional view FIG. 4, it will be seen that, on such tilting, the aft aperture 58 will now be opened to communicate flow of the headspace gas to the seal bore 19. Any product remaining in the bore 19 and spout 80 may thus be forcibly expelled by the out-flow of the headspace gas. This type of purging action disclosed, in my co-pending application Ser. No. 677,360, hereinabove referred to, is especially likely to be required where product residues have reacted chemically with each other.

Alternatively, if a second dip tube, such as the dip tube 72, be inserted in the aft socket-aperture 58, aft tilting will dispense the second fluid only, whereas forward tilting would dispense both the first and second fluids together. This alternate utilization will be advantageous in such uses as where the second fluid is a diluent or neutralizer.

As a further modification, the forward side aperture 58 might be plugged or left unformed, and such a dip tube 72 inserted in the aft aperture only. In such utilization, tilting forward will dispense the first fluid only, while tilting aft will dispense the second fluid only. In such a utilization, by minor modification of the engagement of the actuator 75 on the tubular wall 21 to permit some axially downward movement, a downward force centrally applied to the actuator 75 would serve to dispense the two fluids together if desired.

Instead of using the pre-assembly of FIGS. 1–5, the modified embodiment of pre-assembly illustrated in FIGS. 12–15, utilizing a circular valve head 46' and seal skirt 40', may be substituted; a similarly filled dispensing container j, which is then similarly gassed, and a similar tilt actuator 75 and tilt restrictor ring 74 are utilized. Accordingly, these elements are not described further.

The mounting cup a previously described is utilized in this preassembly without change. Detailed portions of an elastic seal generally designated 20' and a valve member generally designated 45' are in many respects similar to those of the first described embodiment. Though not again described in detail, certain corresponding parts thereof are correspondingly numbered with the superscript ('); and the descriptions heretofore given for the first embodiment are intended to apply, in the manner shown in the drawings FIGS. 12–15.

Figure 13:
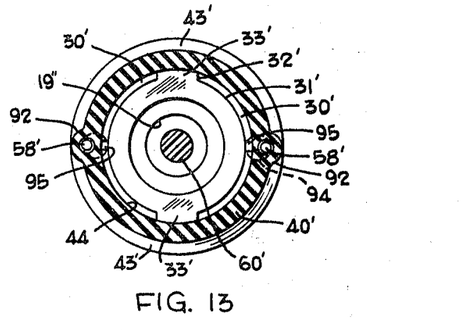
FIG. 13 is a sectional taken along line 13—13 of FIG. 2.
Figure 15:
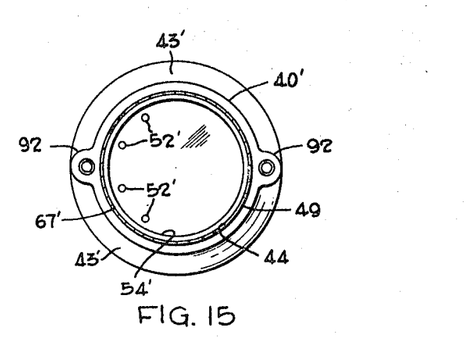
FIG. 15 is a view from below, as seen along line 15—15 of FIG. 12.

Specifically, all portions of the seal 20' and valve member 45' outward of the upper surface 27' of the enlarged lower seal portion 26' may be identical with the previously described embodiment. The head portion 46' is perforated by ports 52' in registration with the seal seat surface 28 precisely as in the embodiment first described, to conduct flow of the first fluid from a bag 67' mounted on a valve head rim 54'. Likewise, the seal seat surface 28' is substantially identical, including its inner margin 29', and the arcuate flow channel walls 31', which bound its outer sides and which are separated by diametrically opposed portions 33. The seal 20' and valve member 45' are modified, however, in at least these respects; a sealing skirt 40' is circular as best shown in FIGS. 13 and 15; and its circular inner skirt surface 44' maintains sealing contact against a conventional circular outer edge 49' of the valve head portion 46'. Narrow opposed outer arcuate surface portions 57' along a circular outer edge 49' and in registration with the narrow arcuate flow channel portions 30' of the seal 20', serve with them as flow-conducting means for the second fluid.

Figure 12:
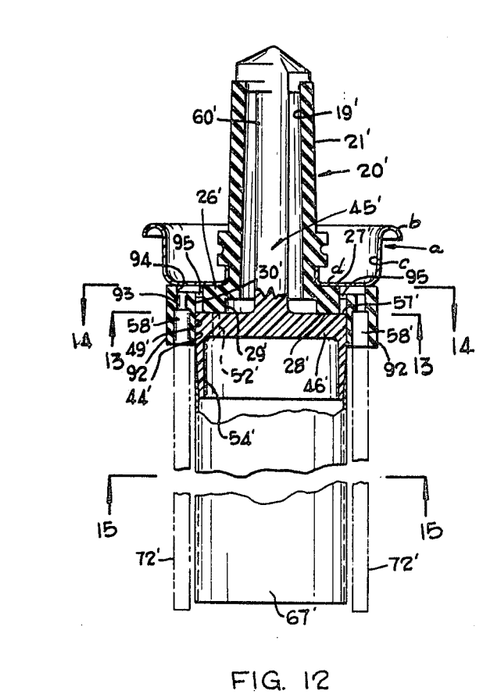
FIG. 12 is a side view principally in section of an alternate embodiment of the present invention, showing a valve and bag pre-assembly designed to permit flow from two dip tubes, shown in phantom lines, to bypass the skirt of the seal.
Figure 14:
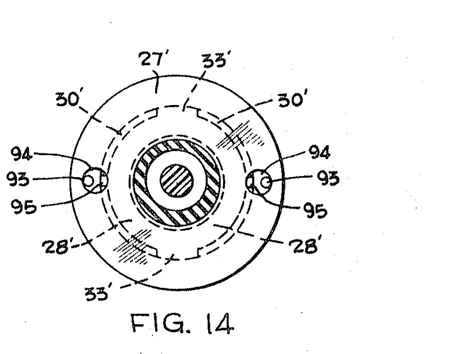
FIG. 14 is a view partly in section as seen along line 14—14 of FIG. 12.

Outward of the skirt 40' are two tapering flexible seal flange portions 43', separated by a pair of molded bosses 92 which extend downwardly the full depth of the skirt 40'. As will be seen from FIGS. 12 and 15, the bosses 92 are formed at the outer side of the skirt 40'. As shown in FIG. 12, each is molded with a bore and counter bore to serve as an aperture and surrounding socket 58' in which dip tubes 72', shown in phantom lines, may be inserted and retained elastically. The combined aperture sockets 58' serve as an entrance portion to flow channel means, which includes an upward leading circuit 93 through the seal 20' and open to its upper surface 27'. At this surface are inwardly formed, inwardly-extending conduit indentations 94, which conveniently may be circular as best shown in FIG. 14. Final conduit portions 95 extend downwardly at the inner side of the conduit indentations 94, to introduce flow of the second fluid to the arcuate flow channel portions 30'. Such conduit portions 93, 94, 95 are readily formed on molding the seal 20' to conduct flow of such second fluid from the dip tube sockets 58' outward of the skirt 40', thence thereabove, inward and downward. Pressure of gas against the flexible seal flange portions 43' outwardly flanking the conduit indentations 94 seal off said conduit indentations 94 against the undersurface of the mounting cap top wall d.

As in the prior embodiment, either of the socket apertures 58' may be plugged or may remain unformed, for the purposes hereinabove described. With perforated ports 52' on one side only of the valve head portion 46', omitting the dip tube 72' on the opposite side fits this embodiment for purging, while its inclusion permits alternate discharge, on aft tilting, of the second fluid only.

Figure 16:
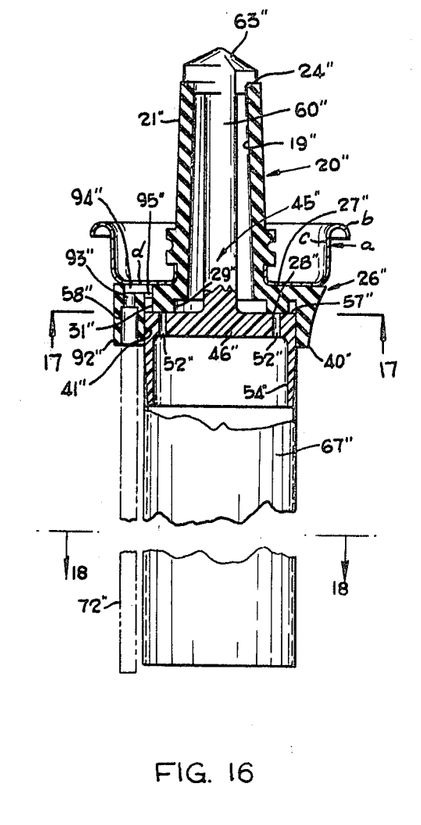
FIG. 16 is a side view principally in section of a still further embodiment of the present invention, somewhat similar to that of FIG. 12 but utilizing a single dip tube and capable of being actuated by tilting at any azimuth angle.
Figure 17:
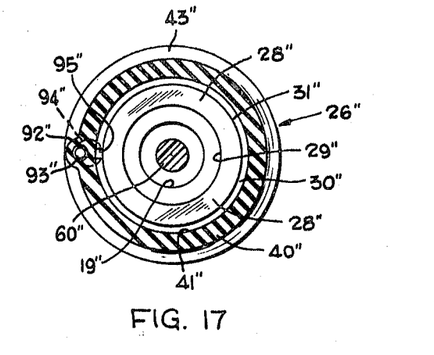
FIG. 17 is a sectional view taken along line 17—17 of FIG. 16.
Figure 18:
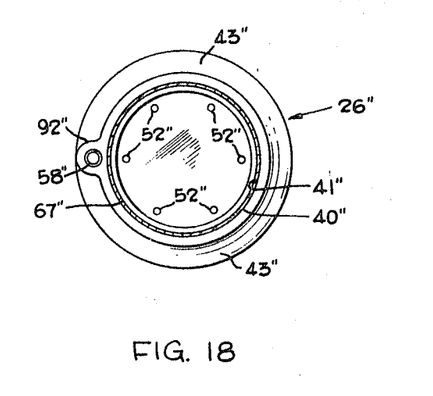
FIG. 18 is a view partly in section taken along line 18—18 of FIG. 16.

The further modified embodiment shown in FIGS. 16–18 is similar to the embodiment of FIGS. 12–16 except in respects specifically noted and shown on the drawings where corresponding parts are correspondingly numbered with the superscript (''). Detailed description of many such parts will be omitted, their construction and operation being clear from the drawings and prior disclosure hereof.

This embodiment is designed to operate by tilting in any direction, and does not possess the advantages of purging or other alternate dispensing action. Hence its enlarged seal portion 26'' has only a single molded boss 92''; otherwise, its tapering flexible flanged portion 43'' is continuous about its circular sealing skirt 40''. The valve head portion 46'' sealed therein is formed identically with that of the previous embodiment, with a circular outer edge 49''; the entire circular upper surface portion immediately adjacent this edge serves as a single flow-conducting surface portion 57''. Perforated ports 52'' are located in a circle inwardly thereof at equal angular intervals, to conduct flow of such first fluid from a bag 67'' sealed to a downward rim 54''.

The seal 20'' has a valve seat 28'' which is circular; bounded on its inner side by an upwardly formed circular inner margin 29'', at its outer side is upwardly formed the circular wall 31'' of flow channel portion 30'', which surrounds the seat surface immediately inward of the inner surface 41'' of the sealing skirt 40''. The single molded boss 92'' serves as the entrance to a second fluid flow conduit like that of the preceding embodiment. Commencing with an aperture socket 58'', such conduit leads to the circular flow channel 30'', and includes an upward-leading outer conduit portion 93'', an inward-leading conduit indentation 94'' molded into the upper surface 27'', and a final conduit portion 95'' at its inner side and leading downward to the circular flow channel 30''.

This embodiment possesses the advantage of simplicity, where the extra functions of the prior-described embodiments are not necessary. It is also well suited to open the circle of ports 52'' gradually on tilting the valve stem 60'', as the relatively narrow circular seat 28'' will gradually deform compressively and angularly, much as in FIG. 10. The elastic tubular wall 21'' serves as compressive spring-like means, acting against the stem head 63'' to lift the valve head portion 46'' against the resistance of the deformable seat surface 28'', as well as to urge it to centered, normally closed position. In this and other respects, the functioning of this modified embodiment will be apparent in view of the explanation of the other embodiments.

From this disclosure, further modifications will be obvious to those familiar with the art, who may wish to apply this disclosure to modified constructions and uses. Accordingly, this invention is not to be construed narrowly but rather as co-extensive with the claims.

I claim:
1. For use to contain a first fluid separate from a second fluid in a pressurized container, for dispensing without inverting the container,
 a valve and collapsible bag pre-assembly comprising
 a container top wall member having an aperture about an axis,
 an elastic seal mounted sealedly within the aperture and having a bore concentric with said axis, and a tubular wall portion extending outwardly through the aperture, the seal further having
 an enlarged seal portion at and beneath the top wall member and including a downwardly presented seat surface having an inner margin surrounding the bore, a flow channel portion farther outward from the axis than the inner margin of the seat surface, and an integral downward extending sealing skirt surrounding the seal surface and flow channel portion
 said pre-assembly further comprising
 a substantially rigid valve member having central means to open the valve member through the seal bore, further having
 a head portion having an outer edge within and sealedly engaged by the sealing skirt,
 an upper surface including a closing surface portion in registration with the seal seat surface,
 port means extending through the head to a part of its upper closing surface portion in registration with the seal seat surface, and
 a downwardly-presented bag attachment rim surrounding the port means,
 in combination with
 a collapsible bag sealedly attached to the rim, whereby such first fluid may be contained therein confined when the valve head is closed against the valve seating surface, and
 flow channel means to introduce flow of a second fluid to a point between the valve head and the seal inwardly of its skirt and outwardly of its seat surface, and
 means to attach a dip tube and to conduct flow therefrom to the flow channel means so provided,
 whereby such second fluid may flow thereto despite the sealed engagement of the sealing skirt to the outer edge of the valve head.

2. A valve and collapsible bag pre-assembly as defined in claim 1, wherein
 the central means to open the valve member is a stem portion, in combination further with
 spring-like means to urge the stem portion normally to close the valve head against the seat surface of the seal.

3. A valve and collapsible bag pre-assembly as defined in claim 1, wherein
 the seal tubular wall portion has a radially enlarged retention flange overlaying the edge of the aperture, and
 the central means to open the valve member is a stem portion extending outward normally concentrically through the tubular wall portion and having means abutting the tubular wall portion above the aperture to exert a lifting force on the valve member when tilted,
 said stem portion being of lesser thickness than the inner diameter of the tubular wall portion,
 whereby on application to the outwardly extending stem portion of a tilt opening force, the valve head will be restrained by the sealing skirt from sliding across the seat surface of the seal and will open from said seat surface angularly within the sealing skirt as the stem portion tilts out of concentricity within the wall portion, thereby to provide fluid flow across the inner margin of the seal seating surface to the tubular wall portion.

4. A valve and collapsible bag pre-assembly as defined in claim 1, wherein
 said flow channel means and port means are positioned at the same side of said axis, whereby to discharge said first and second fluids together when the valve head is unseated at that side, together with
 second flow channel means positioned at the opposite side of said axis, there to introduce fluid flow to a point between the valve head and the seal inwardly of its skirt and outwardly of its seat surface, and
 means to restrict tilt opening of the valve head toward one or the other of the opposite sides.

5. A valve and collapsible bag pre-assembly as defined in claim 1, wherein
 said flow channel means and port means are positioned at the same side of said axis, whereby to discharge said first and second fluids together when the valve head is unseated at that side, together with
 second flow channel means positioned at the opposite side of said axis, there to introduce fluid flow to a point between the valve head and the seal inwardly of its skirt and outwardly of its seat surface, and
 means to restrict tilt opening of the valve toward one or the other of the opposite sides,
 together further with
 means to attach a dip tube in flow conducting relation to said second flow channel means.

6. A valve and collapsible bag pre-assembly as defined in claim 1, wherein
 the flow channel means includes an aperture through the valve head outward of the bag attachment rim.

7. A valve and collapsible bag pre-assembly as defined in claim 1, wherein
 the valve head is a plate-like member having a portion extending outward of the bag attachment rim, and
 the flow channel means includes an aperture through said portion at which the means to attach a dip tube is positioned.

8. A valve and collapsible bag pre-assembly as defined in claim 1, wherein
 the valve head is a plate-like member having parallel flat sides opposite to each other and extending outward of the bag attachmment rim, and
 the skirt portion of the seal has similar flat parallel side parts encompassing the sides of the plate-like member, and
 the flow channel means includes an aperture through said outward extending portion of the plate-like member, at which aperture the means to attach a dip tube is positioned,
 whereby on tilting the valve head, one of said parallel flat sides abuts against the corresponding flat sides of the skirt and guides the tilt movement of the valve member.

9. A valve and collapsible bag pre-assembly as defined in claim 1, wherein
 the flow channel means includes a flow conduit through the seal, said flow conduit having
 an entrance portion outward of the skirt and leading thereabove to said point outwardly of the seal seat surface to which flow of the second fluid is introduced, together with
 means to attach a dip tube at said entrance portion of the flow conduit.

10. A valve and collapsible bag pre-assembly as defined in claim 1, wherein
 the flow channel means includes a conduit through the seal having an entrance portion outwardly of the skirt and leading upward through the seal to the upper surface of the enlarged portion of the seal at the container top wall member, and further includes an inward extending conduit indentation formed downwardly from said upper surface of the seal and connecting to said entrance portion, and a final conduit portion extending downwardly from said indentation to the said flow channel means inwardly of the skirt, and wherein the enlarged seal portion at and beneath the top container member has elastic portions outwardly flanking said conduit indentations, whereby to maintain said indentations sealed against the container top member under gas pressure within a dispensing container to which said pre-assembly is sealed.

11. A valve and collapsible bag pre-assembly as defined in claim 1, wherein the seal portion beneath the top wall member has an interrupted arcuate flanged portion less than 360° in extent on both sides of the axis positioned outwardly of the skirt and presented downwardly, whereby pressure within the dispenser against the said interrupted arcuate flanged portion will hold the seal portion beneath the top wall member securely thereagainst.

12. A valve and collapsible bag pre-assembly as defined in claim 1, wherein the seal seat surface defines a plane of closing, and the flow channel means includes a flow channel portion of the seal formed upwardly from said plane inwardly of the skirt and outwardly adjacent to the seal seat surface, and further includes a flow channel-completing surface portion of the valve head outward of its closing surface.

13. A valve and collapsible bag pre-assembly as defined in claim 1, wherein the seal seat surface defines a plane of closing, and the flow channel means includes a first flow channel portion of the seal formed upwardly from said plane inwardly of the skirt and outwardly adjacent to the seal seat surface at one side of said axis and extending less than 180° thereabout, in combination with second flow channel means positioned at the other side of said axis to introduce fluid flow to a point between the valve head and seal inwardly of its skirt and outwardly of its seat surface, and diametrically opposed portions in said plane and separating the first and second flow channel portions from each other, the portion of the seat surface to which the port means of the valve head is in registration being sideward of said diametrically opposed portions and between one of said flow channel portions and the inner margin of said seat surface.

14. A valve and collapsible bag pre-assembly as defined in claim 13, wherein the seal tubular wall portion has a radially enlarged retention flange overlaying the edge of the aperture, and the central means to open the valve member is a stem portion extending outward normally concentrically through the tubular wall portion and having projecting means abutting the tubular wall portion above the aperture to exert a lifting force on the valve member when tilted, and wherein the upwardly-formed depth of the flow channel portion, adjacent to the seal seat surface against which the port means is in registration, is sufficiently great, compared to the width of said seal seat surface portion, that said lifting force exerted on the valve member, when tilted to open the side opposite the port means, will compressibly deform said seat surface portion upwardly from said plane, thereby continuing to hold said port means closed.

15. Dip tube type apparatus for valved dispensing of a plurality of fluids through a single spout, comprising (1) a container, pressure vessel type, (2) a valve and collapsible bag pre-assembly including
  (a) a container top wall member having an aperture about an axis,
  (b) an elastic seal including a tubular wall portion therein and having flange means overlaying the edge of the aperture, and a seat surface inwardly of the container top wall member and sideward of the axis,
  (c) a valve member having a head portion closing against said seat surface, a stem portion extending outward through the tubular wall portion and normally concentric with the axis and there including means to retain the valve member upward, port means, through the head portion in registration with the seal seat surface at one side of the axis, to introduce a first fluid to said seat surface, a bag attachment rim surrounding the port means,
  (d) flow channel means to introduce the flow of a second fluid to a point radially outward of the seat surface, and
  (e) a collapsible bag, wherein to contain such first fluid, sealedly attached to said rim, (3) dip tube means to conduct flow of a second fluid to said flow channel means, (4) tilt actuator means including means to apply a tilting force to the valve stem portion whereby to open the valve closing surface from the seal seat surface, and (5) means cooperating with the tilt actuator means to direct tilting thereof to an azimuth angle at which the port means is withdrawn downwardly from the seal seat surface.

16. Dip tube type apparatus as defined in claim 15, wherein the means to retain the valve member upward includes a keying projection overlaying a part of the tubular wall portion outwardly of the container top wall member, and wherein the tilt actuator comprises a dispensing spout having a sleeve portion fitted on the outer tubular wall portion of the elastic seal, a spout portion extending sideward thereabove, and an intermediate portion having non-circular aperture means to permit flow communication therebetween and to align the sideward extension of the spout with the said keying projection on the valve stem.

17. Dip tube type apparatus as defined in claim 15, wherein the tilt actuator means includes a sleeve portion extending upwardly of the container top wall member and having opposed tilt-restricting projections, and a spout in flow communication with said sleeve portion extending sideward at an angle intermediate to the opposed projections, and wherein the means cooperating with the tilt actuator means includes a ring positioned rotatably around the said sleeve portion and having an inner wall including a portion thereof abutting closely against the tilt actuator sleeve portion over an angle not exceeding 180°, whereby to prevent tilting of the actuator over such angular extent, and a portion substantially 180° in angular length spaced away from said actuator sleeve portion, whereby forward tilting movement is permitted when said spaced away portion is rotated into position forward of the sleeve portion of the actuator means, the ring having an upper surface beneath and abuttingly adjacent to the tilt restricting projections, and means indented in said upper surface to accommodate the tilt restricting projections of the actuator sleeve portion on forward and downward movement attendant to such forward tilting.

18. A dip tube type apparatus as defined in claim 17, wherein
- the tilt restricting projections extend diametrically opposite to each other, and
- the ring is rotatable through an angle 180° from such forward tilt position to an aft tilt position, and
- the means indented in the upper surface are immediately forward of the projections when the ring is positioned angularly for forward tilting, thereby to be immediately aft of said projections when the ring is rotated into position for aft tilting.

References Cited
UNITED STATES PATENTS

| | | | |
|---|---|---|---|
| 2,947,449 | 8/1960 | Hernandez | 222—94 |
| 3,325,056 | 6/1967 | Lewis | 222—94 |

ROBERT B. REEVES, Primary Examiner

H. S. LANE, Assistant Examiner

U.S. Cl. X.R.

222—144.5